United States Patent [19]

Aftergut et al.

[11] 4,378,302

[45] Mar. 29, 1983

[54] RED PERYLENE DICHROIC DYE CONTAINING LIQUID CRYSTAL FORMULATIONS

[75] Inventors: Siegfried Aftergut, Schenectady; Herbert S. Cole, Jr., Scotia, both of N.Y.

[73] Assignee: General Electric Company, Schenectady, N.Y.

[21] Appl. No.: 217,267

[22] Filed: Dec. 16, 1980

[51] Int. Cl.$^3$ ............................ C09K 3/34; G02F 1/13
[52] U.S. Cl. .............................. 252/299.1; 252/299.5; 350/349
[58] Field of Search .......................... 252/299.1, 299.5; 350/349

[56] References Cited

U.S. PATENT DOCUMENTS

| | | | |
|---|---|---|---|
| 3,960,753 | 6/1976 | Larrabee | 252/299.1 |
| 4,032,219 | 6/1977 | Constant et al. | 252/299.1 |
| 4,128,497 | 12/1978 | Cole, Jr. et al. | 252/299.1 |
| 4,145,114 | 3/1979 | Coates et al. | 252/299.1 |
| 4,211,473 | 7/1980 | Shanks | 252/299 |
| 4,288,147 | 9/1981 | Koch | 252/408 |
| 4,299,720 | 11/1981 | Osman | 252/299.1 |
| 4,304,683 | 12/1981 | Morinaka et al. | 252/299.1 |

FOREIGN PATENT DOCUMENTS

| | | | |
|---|---|---|---|
| 42819 | 12/1981 | European Pat. Off. | 252/299.1 |
| 47027 | 3/1982 | European Pat. Off. | 252/299.1 |
| 2837218 | 3/1979 | Fed. Rep. of Germany | 252/299.1 |
| 2851513 | 6/1980 | Fed. Rep. of Germany | 252/600 |
| 54-48571 | 4/1979 | Japan | 252/299.1 |
| 54-48572 | 4/1979 | Japan | 252/299.1 |
| 8201191 | 4/1982 | World Intel. Prop. Org. | 252/299.1 |

OTHER PUBLICATIONS

Cox, R. J., Mol. Cryst. Liq. Cryst., vol. 55, pp. 1-32 (1979).
Bloom, A. et al., Mol. Cryst. Liq. Cryst., vol. 40, pp. 213-221, (1977).
Bloom, A., et al. Mol. Cryst. Liq. Cryst., vol. 41, (Lett.), pp. 1-4, (1977).

*Primary Examiner*—Teddy S. Gron
*Attorney, Agent, or Firm*—William A. Teoli; James C. Davis, Jr.; James Magee, Jr.

[57] ABSTRACT

Liquid crystal compositions having guest perylene-based dichroic dyes dissolved therein. The perylene dichroic dyes have symmetrically-disposed substituents which are preferably a group forming with the 3,4 and 9, 10 carbons, respectively, a 5 or 6 membered cyclic ring which is substituted by, or fused to, a phenyl ring. The perylene-based dyes of the invention can be used alone or with other compatible dyes as guest dyes to form various colors for coloring the host liquid crystal compositions.

15 Claims, No Drawings

RED PERYLENE DICHROIC DYE CONTAINING LIQUID CRYSTAL FORMULATIONS

BACKGROUND OF THE INVENTION

This invention relates to liquid crystal compositions, and more particularly, to dichroic liquid crystal compositions containing perylene-based dyes.

Liquid crystals are conventionally used in conjunction with one or more dyes to obtain improved colors when liquid crystals are used in liquid crystal displays. In such cases, a host liquid crystal composition comprises a host liquid crystal material and guest dye dissolved in the host liquid crystal material. The guest dyes, which may be used alone or in combination with other dyes to achieve a desired color, preferably have certain properties which enhance their use in liquid crystal compositions. These properties include dichroism, solubility of the dye in the liquid crystal and high order parameter.

Dichroism is the property whereby an oriented assembly of dye molecules exhibit relatively low absorption of a given wavelength in one state of orientation and a relatively high absorption of the same wavelength in another state of orientation with respect to the light source. The orientation can be brought about by dissolution of the dye in a liquid crystal solvent.

Solubility must be sufficiently high so that thin layers, for example, of ten micrometers, have adequate light absorption in one of the oriented states. In certain instances, the solubility of a particular dye may be relatively low, however, the dye may still be used in conjunction with other dyes which are also soluble in the liquid crystal host so that there is adequate light absorption in one of the oriented states.

Order parameter is a quantative measure of the degree of molecular order or alignment in a given system. High order parameter is promoted by dyes with elongated shape having a large ratio of molecular length to breadth, similar to the shape of the molecules of a liquid crystal host material. To insure an elongated shape, the molecules should have a rigid structure. The brightness and contrast are both related to the order parameter, normally designated as S, of the dye, where $S=(R-1)/(R+2)$, and R is the ratio of light absorption in the dye measured with a polarizer respectively parallel and perpendicular to the nematic director of the liquid crystal host at the wavelength of maximum absorption. Advantageously, the order parameter should be at least 0.60, and preferably, as high as possible, to achieve a minimum desired contrast ratio while still allowing a liquid crystal guest-host display to be fabricated with a reasonable brightness parameter.

The eye is sensitive to radiation in the 400-700 nm wavelength range. To fabricate a dichroic liquid crystal display with a neutral black color, for example, the radiation present in a source of illumination, such as, daylight, incandesent lamps or fluorescent lamps, to which the eye is sensitive, must be absorbed to a substantial degree at all wavelengths from 400-700 nm. Since no single dye has efficient absorption over the entire visible spectrum, mixtures of dyes of different colors are required.

Shanks, in U.S. Pat. No. 4,211,473, provides a liquid crystal display device having enhanced contrast, pleochroic and fluorescent materials being incorporated into one or more components of the device. In an example, a white card reflector located behind the liquid crystal is coated with a perylene dye which is Perilene (Fluorol Green-Gold) Color Index No. 59075. This dye absorbs light of blue coloration transmitted by the pleochroic dye and fluoresces by converting the absorbed light into light of longer wavelength (i.e., greenish yellow).

The object of this invention is to provide dichroic liquid crystal formulations utilizing a new class of red dichroic dyes which can be formulated to give useful black mixtures. This and other objects of the invention will be apparent to those skilled in the art from the following detailed description.

BRIEF SUMMARY OF THE INVENTION

In accordance with the invention, dichroic liquid crystal formulations contain dichroic dyes derived from perylene. More particularly, the formulations contain dichroic dyes derived from perylene containing symmetrically-disposed groups which are preferably a group forming 5 or 6 membered cyclic rings substituted, or fused, to phenyl rings.

DESCRIPTION OF THE INVENTION

In accordance with the present invention, there is provided a liquid crystal composition comprising a host liquid crystal material and a guest perylene dye dissolved in said liquid crystal material.

The perylene-based dyes of the present invention are all characterized by being red dichroic guest dyes having a perylene nucleus and having symmetrically disposed substituents. The dyes thus have the general formula

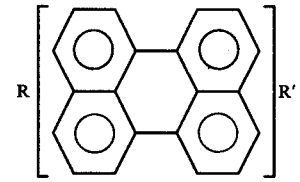

where R and R' represent the symmetrically disposed substituents.

In one preferred embodiment of the red dichroic guest dyes of the present invention, the substituents, R and R', are groups which form with the c,d and l,m carbon atoms of the perylene nucleus, respectively, a 5 or 6 membered cyclic ring and the ring is further substituted by, or fused to, a phenyl ring. One example of this group of dyes is the commercially available dye Periflanthene which is a material of the formula

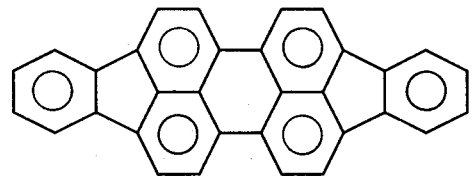

and chemically is diindeno[1,2,3-c,d:1,',2',3'-l,m]perylene. This dye shows a high order parameter in liquid crystal hosts with peak absorption at 505 and 454 nm. The order parameter S of this dye is 0.72 in E-7, a commercially available nematic liquid crystal of the biphenyl type and 0.77 in Merck 1291, a phenylcyclohexane liquid crystal mixture. The fused ring structure lends itself to being extremely inert and while the dye is only sparingly soluble in the liquid crystal material, it is particularly useful as an additive in black liquid crystal formulations or in modifying the color of other dye mixtures.

Another subclass of the embodiment of red dichroic perylene guest dyes are those in which the substituent is of the formula

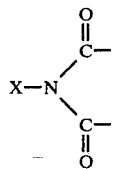

in which X is straight or branched chain alkyl of one to about 10 carbon atoms or aryl of 6 to about 20 carbon atoms, unsubstituted or substituted with such groups as nitro, cyano, amino, hydroxy, halo, alkyl, aryl, alkoxy and the like. Typical X groups include methyl, ethyl, propyl, isopropyl, butyl, isobutyl, pentyl, hexyl, decyl, isoamyl, isoheptyl, isononyl, methoxymethyl, methoxyethyl, 4-methoxybutyl, 3-ethoxypropyl, 3,3-dichloropropyl, 4-bromobutyl, trichloromethyl, 2,2-difluoroethyl, phenyl, tolyl, p-dimethylaminophenyl, 3,4-diethyloxyphenyl, and the like. These dyes can be prepared by reacting perylene dianhydride with an appropriate amine. For example, the dye

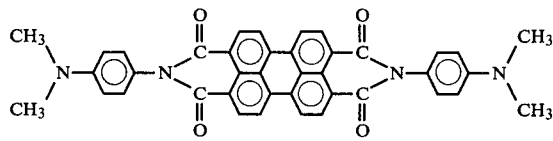

can be prepared by reacting perylene dianhydride with N,N-dimethyl-p-phenylenediamine. Similarly, the dye

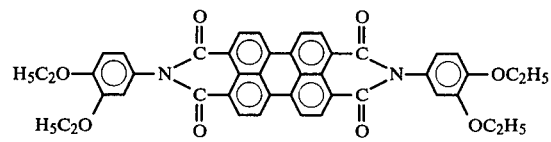

can be prepared using 3,4-diethoxyaniline as the amine, and the dyes

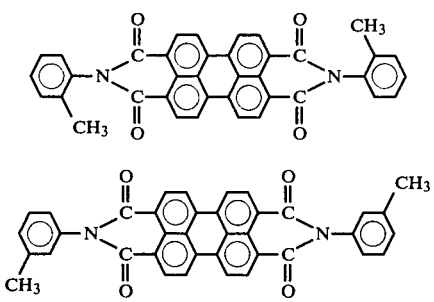

can be prepared using meta-toluidine and ortho-toluidine, as the amine. Other members of this group are commercially available such as the dye

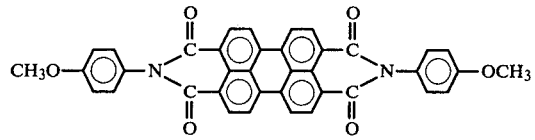

which is commercially available as Indanthrene Scarlet R.

The red perylene dyes of the present invention can be used in any conventional manner. However, in certain cases they are not used alone in liquid crystal compositions and may be used as a plurality of dyes and/or in combination with other dyes, modifiers or adjuvants. Because certain of the dyes have relatively low solubility in the liquid crystals, the dyes are not used by themselves in liquid crystal displays, but the dyes are useful as additives in conjunction with other dyes to improve the color of, for example, black, green and blue displays. Accordingly, the dyes of this invention are used with liquid crystal host materials well-known in the art to improve the color of the liquid crystal composition for use in a liquid crystal display. When the dyes of this invention are used with a liquid crystal host, they are called guest dyes and they are dissolved in the host liquid crystal material, that is, the guest perylene-based dye is soluble in the host liquid crystal material. The dyes used in accordance with the present invention may require mild heat, for example, above ambient to about 110° C. to promote their dissolution in the host liquid crystal.

In accordance with the present invention, it is not critical how much of the dye is present in the host liquid crystal as long as the dye is soluble therein. In preferred embodiments, about 0.05% by weight to about 1.0% by weight, and more preferably about 0.1% by weight to 0.5% by weight, based upon the weight of the liquid crystal host material, of the dye of this invention or mixtures of dyes of this invention are present in the host liquid crystal. One skilled in the art can adjust the amount of perylene based dye as desired and can determine the maximum solubility of the dye and/or the amount required for maximum absorption. The upper limit of the amount of dye varies with the solubility of the particular dye in the host liquid crystal. The amount of guest dichroic dye of the present invention in the host liquid crystal material is that amount up to the limit of maximum solubility in the host of the dye required to color, tint or shade the host liquid crystal, or required to contribute to the color of a mixture of dyes used in the host liquid crystal material, e.g., the use of the red perylene-based dye or dyes of this invention with dyes of other colors to improve the black and red color of guest dyes in the host liquid crystal.

The guest perylene dichroic dyes of this invention are particularly useful in black liquid crystal displays because improved black liquid crystal materials can be obtained by mixing dichroic dyes of various colors in proper proportions to obtain a material which absorbs radiation in the spectral range of about 400–700 nm. Thus, in accordance with the present invention, improved black and red dichroic liquid crystal displays, for example, are achieved by providing a host liquid crystal material and mixing therewith dichroic dyes of various colors in suitable proportions to obtain a material which absorbs radiation in all or part of the spectral range of about 400–700 nm, wherein the dichroic dyes of various colors include a dye having the general formula:

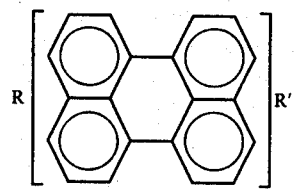

The appropriate mixture of dichroic dyes of various colors in suitable proportions to obtain a material which absorbs radiation in the spectral range of about 400–700 nm, and which approaches a substantially black appearance in color, is within the purview of one skilled in the art, and the improvement of the present invention is directed to the use of one or more of the perylene-based dyes to improve the "blackness" of the dichroic dye mixture in a liquid crystal display made from various colors. In those embodiments of the present invention wherein the perylene-based dichroic dye material is used as a guest dye in a host liquid crystal material, it is not critical which of the many well known liquid crystal materials or combinations thereof may be used as long as the perylene-based dye materials of the present invention are soluble in the host liquid crystal material and as long as the dye or dyes of the present invention are compatible with, or have no adverse effect upon, the host liquid crystal material. In preferred liquid crystal compositions of the present invention, the host liquid crystal material is a nematic liquid crystal of positive or negative dielectric anisotropy, a cholesteric liquid crystal of positive or negative dielectric anisotropy and mixtures thereof, that is, mixtures of nematic liquid crystals and cholesteric liquid crystals modified with other optically active compounds.

Any conventional liquid crystal host material can be used with the red perylene dyes of the present invention. The liquid crystal hosts can be selected by one skilled in the art depending upon the electro-optic effect to be utilized. Nematic liquid crystals include the biphenyl liquid crystals such as E-7 and E-8 from BDH, Ltd.

Biphenyl liquid crystal E-7 is a eutectic of the following general formula:

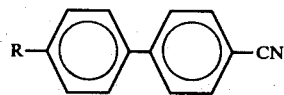

where R is a mixture of $C_5H_{11}$, $C_7H_{15}$, $C_8H_{17}O$ and

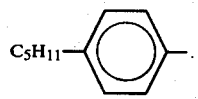

Other nematic liquid crystals include esters available from E. Merck Associates and Hoffman-LaRoche Co., phenylcyclohexanes and azoxy mixtures available from E. Merck Associates, alkoxybenzylidene anils such as those having the structual formula:

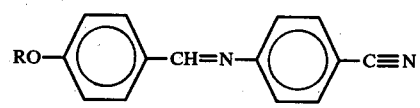

wherein OR is an alkoxy radical preferably having from 1 to 7 carbon atoms or an acyloxy radical having from 2 to 7 carbon atoms, p-apisylidene-p'-butylaniline, p-anisylidene-p'-aminophenyl-butyrate, p-(p'-methoxyphenylazoxy)butylbenzene, p-(p'-ethoxyphenylazo)-phenylheptanoate, p-n-hexylbenzoic acid-p'-n'-hexyloxy-phenyl ester, and other liquid crystal materials, such as the esters disclosed in U.S. Pat. No. 3,984,344, p-n-hexylbenzylidene-p'-amino-benzonitrile, p-capryloxybenzylidene-p'-aminobenzonitrile, p-cyanophenyl-p'-n-heptylbenzoate, p-cyanobenzylidine-p'-n-butoxyaniline, p-cyanobenzylidene-p'-aminophenylvalerate, p-azoxyanisole, butyl-p-(p'-ethoxypehnoxycarbonyl)phenylcarbonate, p(p'-ethoxyphenylazo)-phenylheptanoate, and the like. Another class of liquid crystal materials have the general formula:

wherein R is an alkyl or alkoxy group and m=0 or 1, at least one of said compounds being cyanobiphenyl wherein m=0. Generally, nematic liquid crystals fall within the class of chemical compounds having the general formula:

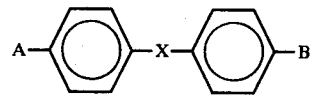

wherein X is an azomethine likage of the Schiff base class, X is an ester, vinylene, acetylene, azo or azoxy, or X is merely a single bond connecting the two benzene rings; and A and B are $C_nH_{n+1}$ (alkyl group); $C_nH_{n+1}O$ (alkoxy group); or $C_nH_{n+1}COO$ (ester group). Cholesteric liquid crystals can be pure compounds such as derivatives of cholesterol or noncholesteric materials. These are characterized by optical activity arising from the absence of molecular symmetry.

Examples of specific commercial nematic liquid crystals include BDH Chemicals' E-7, a phenyl type material whose temperature range is −10° to 60° C. with a dielectric anisotropy of 11, and E-8 with a temperature range of about −10° to 70° C. with a dielectric anisotropy of 13; E. Merck Associates' phenylcyclohexane type materials Licristal 1132 having a temperature range of −6° to 70° C. with a dielectric anisotropy of 10, and Licristal 1221 having a temperature range of −10° to 90° C. with dielectric anisotropy of 8; Hoffman-LaRoche's ROTN-103, an ester type having a temperature range from about −10° to 80° C. with dielectric anisotropy of 26, ROTN-200, a Schiff base type having a temperature range of about −15° to 65° C. with a dielectric anisotropy of 18, and ROTN-404, a biphenyl-pyrimidine type having a temperature range from about −10° to 105° C. and a dielectric anisotropy of 21.

The following examples further illustrate the practice of the invention, and they are meant to be exemplary only and are not to be construed as to limiting the invention in any way.

EXAMPLE 1

A mixture of 0.1 mole of perylene dianhydride and 0.5 mole of N,N-dimethyl-p-phenylenediamine were refluxed for 12 hours using N-methyl-2-pyrrolidone as a solvent. The reaction mixture was allowed to cool and water and acetone added in order to precipitate the dye. The precipitated dye was collected and copiously washed with acetone. The dye realized was of the formula

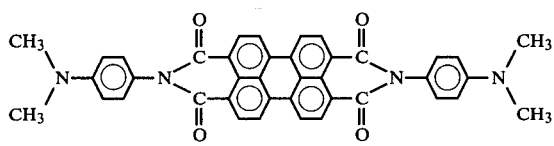

EXAMPLE 2

Example 1 was repeated except that 3,4-diethoxyaniline was used in place of the N,N-dimethyl-para-phenylenediamine. The resulting dye was of the formula

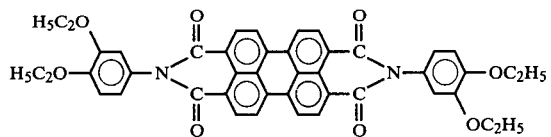

EXAMPLE 3

Example 1 was repeated except that m-toluidine was used in place of the N,N-dimethyl-para-phenylenediamine. The resulting dye was of the formula

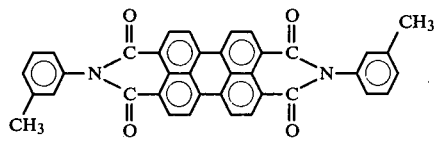

EXAMPLE 4

Example 1 was repeated except that o-toluidine was used in place of the N,N-dimethyl-para-phenylenediamine. The resulting dye was of the formula

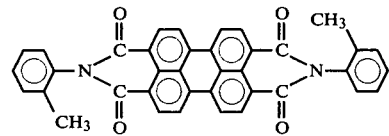

EXAMPLE 5

A dichroic liquid crystal mixture was prepared using 0.1 wt.% of diindino[1,2,3-c,d:1',2',3'-l,m]perylene and 0.8 wt.% of yellow dye 4,4'-bis[3-methyl-5-methoxy-4-(4-pentoxybenzoyl)phenylazo]azobenzene in Licristal 1291, a phenylcyclohexane nematic liquid crystal. The mixture was placed in a conventional test cell having a distance of about 18 microns between the glass plates, the inner surfaces of which had been rubbed unidirectionally to control the alignment of the liquid crystal. A single polarizer was attached to the cell. In the quiescent state, the liquid crystal mixture was orange-red and when electrically switched to the activated state, the mixture was clear.

EXAMPLE 6

A black liquid crystal mixture was prepared using 0.8 wt.% yellow dye 4,4'-bis[3-methyl-5-methoxy-4-(4-pentoxybenzoyl)phenylazo]azobenzene, 0.1 wt.% diindino[1,2,3-c,d:1',2',3'-l,m]perylene, 0.4 wt.% blue dye 4,4'-bis(4-N-ethylaminonaphthylazo)-3,5-dimethyl-azobenzene and 0.1 wt.% blue dye 1,4-diamino-N-(3-methoxypropyl)-2,3-anthraquinone dicarboximide [Genacron Brilliant Blue]. The host liquid crystal material was ROTN-404 which is a biphenyl-pyrimidine type liquid crystal having a temperature range from about $-10°$ to $105°$ C. which had 5 wt.% of optically active chiral dopant CB-15, i.e., 4-cyano-4'-(2-methyl)-butylbiphenyl, added. It was noted that the red dye of the present invention gave a more uniform absorption of light over the entire visible spectrum and that the usual window at 550 nm was eliminated. The formulation was placed in a conventional homeotropic liquid crystal test cell having a spacing between the plates of about 12 microns. In the absence of voltage, the color of the display was neutral black and when a voltage of about 15 volts was applied, the neutral black material turned substantially colorless.

Various changes and modifications can be made in the process and products of this invention without departing from the spirit and scope thereof. The various embodiments which have been disclosed herein were for the purpose of further illustrating the invention but were not intended to limit it. Throughout this specification and claims, all parts and percentages are by weight and all temperatures in degrees Celsius unless otherwise indicated.

We claim:

1. A dichroic liquid crystal composition comprising a host liquid crystal material and a dye composition having a solubility in said host liquid crystal material which is sufficient to produce a mixture having about 0.05% by weight to about 1% by weight, based on the weight of the liquid crystal host material, where said dye composition contains as an essential ingredient a red dichroic dye having the formula,

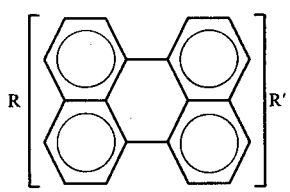

where the R and R' groups each forms a 5 or 6 membered cyclic ring which is substituted by or fused to a phenyl ring or each forms a group

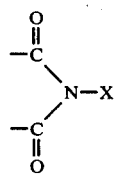

with the 3, 4, or 9, 10 carbons of the perylene nucleus and
where X is substituted or unsubstituted alkyl or aryl.

2. The liquid crystal composition of claim 1 wherein said red perylene dye is

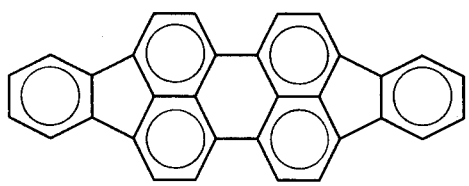

3. The liquid crystal composition of claim 1 wherein X is substituted phenyl.

4. The liquid crystal composition of claim 3 wherein said dye is

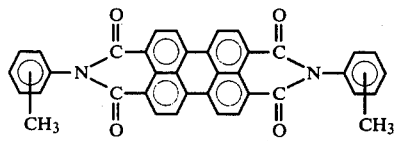

5. The liquid crystal composition of claim 3 wherein said dye is

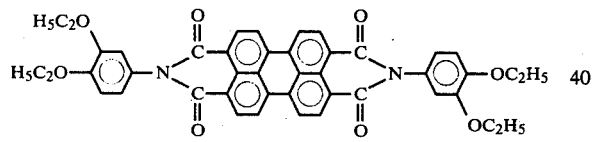

6. The liquid crystal composition of claim 3 wherein said dye is

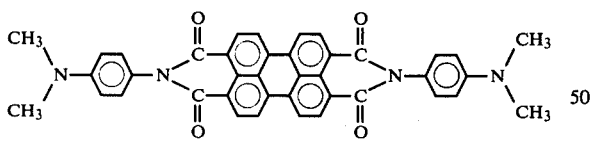

7. The liquid crystal composition of claim 1 wherein said dichroic dye is a mixture of dichroic dyes of various colors in proper proportion to obtain a material which absorbs radiation in at least part of the spectral range of about 400–700 nm.

8. The liquid crystal composition of claim 7 in which said mixture of dichroic dyes absorbs radiation in all of said spectral range of about 400–700 nm.

9. A method of improving the color of dichroic dyes for use in liquid crystal displays comprising the step of: adding to a host liquid crystal material, a dye composition which contains at least one dichroic dye in a proportion to absorb radiation in at least a part of the spectral range of about 400–700 nm, where said dye composition is sufficiently soluble in said host liquid crystal material to produce a display composition having about 0.05% by weight to about 1.0% by weight of the dye composition in the host liquid crystal material wherein at least one of the dichroic dyes is a red guest dye having the formula

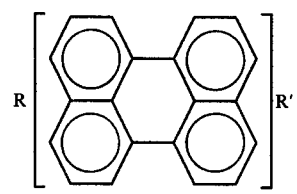

where the R and R' groups each forms a 5 or 6 membered cyclic ring which is substituted by or fused to a phenyl ring or each forms a group

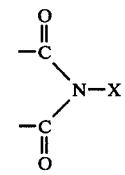

with the 3, 4 of 9, 10 carbons of the perylene nucleus and
where X is substituted or unsubstituted alkyl or aryl.

10. The method of claim 9 wherein said red perylene dye is

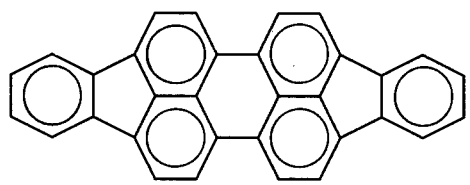

11. The method of claim 9 wherein X is substituted phenyl.

12. The method of claim 9 wherein said dye is

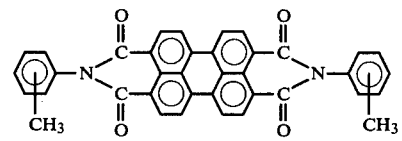

13. The method of claim 9 wherein said dye is

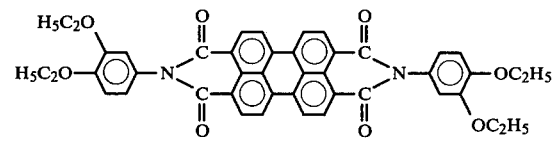

14. The method of claim 9 wherein said dye is

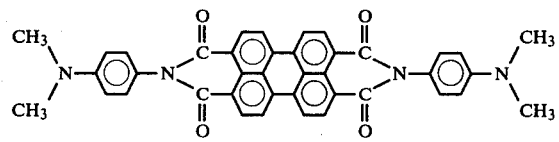

15. The method of claim 9 wherein the dichroic dyes are present in proper proportion to realize a black display in the absence of applied voltage.

* * * * *